No. 718,067. PATENTED JAN. 13, 1903.
J. Q. ADAMS.
POTATO PLANTER.
APPLICATION FILED FEB. 27, 1902.
NO MODEL. 2 SHEETS—SHEET 1.
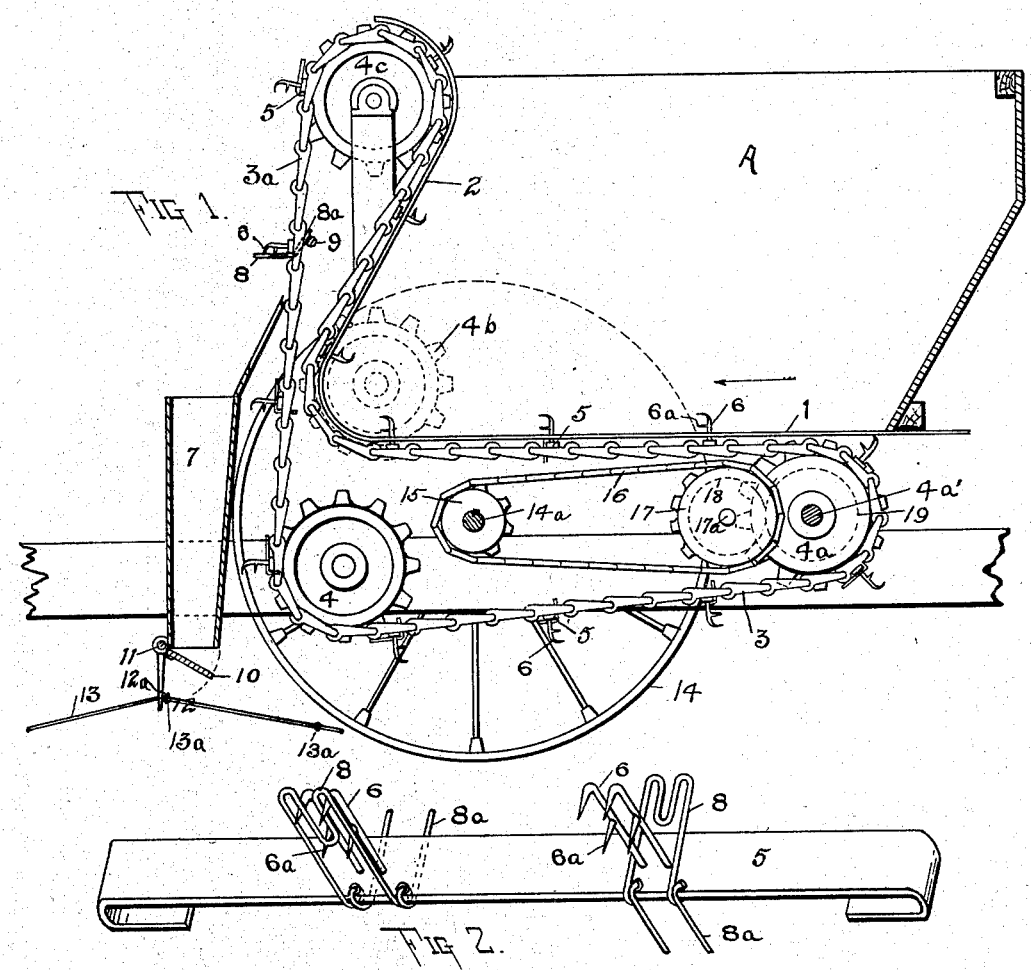
WITNESSES:
James C. Hanson
Cl. Gould
John Q. Adams, INVENTOR
BY
Geo B Willcox ATTORNEY No. 718,067. PATENTED JAN. 13, 1903.
J. Q. ADAMS.
POTATO PLANTER.
APPLICATION FILED FEB. 27, 1902.
NO MODEL. 2 SHEETS—SHEET 2.

WITNESSES: John Q. Adams INVENTOR:
James C. Hanson.
C. Gould
BY
Geo. B. Willcox ATTORNEY

UNITED STATES PATENT OFFICE.

JOHN Q. ADAMS, OF TUSCOLA, MICHIGAN.

POTATO-PLANTER.

SPECIFICATION forming part of Letters Patent No. 718,067, dated January 13, 1903.

Application filed February 27, 1902. Serial No. 95,958. (No model.)

*To all whom it may concern:*

Be it known that I, JOHN Q. ADAMS, a citizen of the United States, residing at Tuscola, in the county of Tuscola and State of Michigan, have invented certain new and useful Improvements in Potato-Planters; and I do hereby declare the following to be a full, clear, and exact description of the invention, such as will enable others skilled in the art to which it appertains to make and use the same.

My invention relates to certain new and useful improvements in potato-planters; and the improvements consist in the construction and combination of parts, as will be hereinafter set forth, and specifically pointed out in the claims.

My invention is illustrated in the accompanying drawings, in which—

Figure 3:
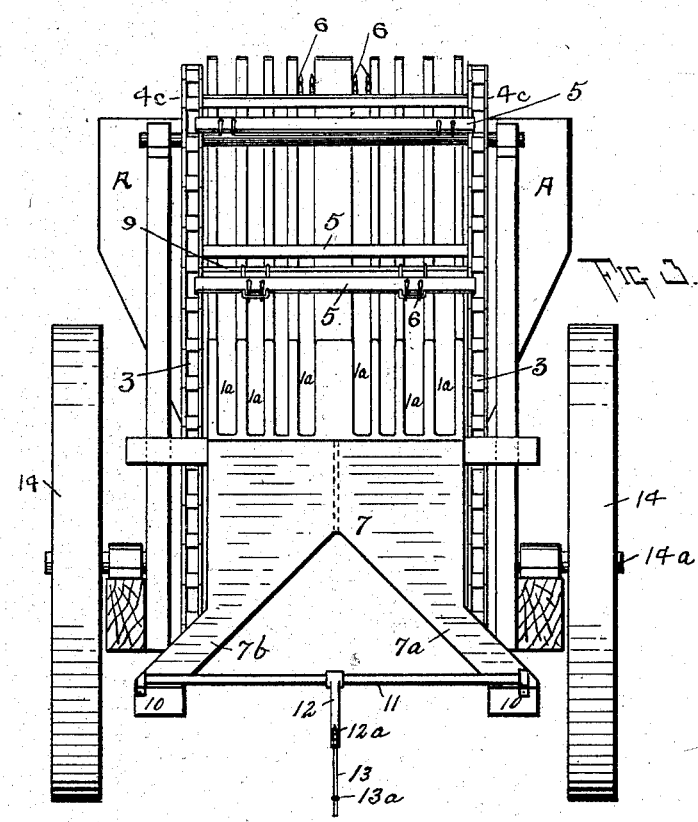
Figure 4:
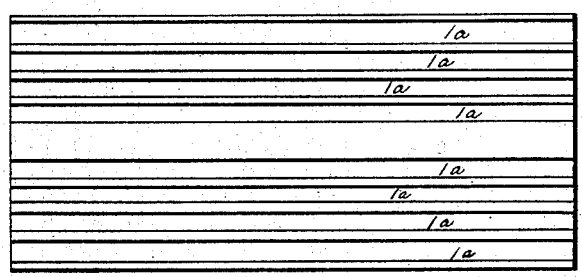

Figure 1 is a vertical longitudinal section through the working parts of the machine. Fig. 2 is a perspective detail of one of the claw-carrying bars. Fig. 3 is a rear elevation of the parts shown in Fig. 1. Fig. 4 is a detail of the hopper-bottom.

A represents a hopper in which the potatoes to be planted are placed. Its bottom 1 and rear end 2 are formed of narrow metal bars or slats separated by open spaces running lengthwise the bottom and up the rear side. A conveyer-chain 3 travels along the bottom of the hopper and below it and thence up the inclined rear end 2 of the hopper, as shown in Fig. 1. Each conveyer-chain is mounted on a series of sprocket-wheels 4, 4$^a$, 4$^b$, and 4$^c$, carried by the frame of the machine. Both chains are driven simultaneously by the action of the sprocket-wheels 4$^a$, which are mounted upon the same axle 4$^{a\prime}$.

Cross-bars 5, extending transversely from one of the chains to the other, are arranged at suitable intervals throughout the length of the chains. Each bar 5 carries one or more pairs of upwardly-extending prongs 6, bent forward at their upper ends, so as to form claws upon which the potatoes are impaled. Auxiliary points 6$^a$ are secured to the prongs 6, as shown in Fig. 2, to more firmly hold the potato in place. When the chains 3 are set in motion by the sprockets 4$^a$, the bars 5 move along the bottom and up the rear end 2 of the hopper, each pair of prongs 6 projecting into the hopper through the longitudinal slits or openings 1$^a$ in the bottom 1 and end 2. As the prongs travel along the bottom of the hopper in the direction of the arrow, Fig. 1, each pair impales a potato and carries it along the bottom and up the inclined end 2, the rearward inclination of which permits loose pieces to drop back into the hopper, while the impaled pieces are carried on over the pulley 4$^c$ and down the flight 3$^a$, as shown in Figs. 1 and 3. Below the flight 3$^a$ is a chute 7, into which the potatoes are dropped and by which they are guided into the furrow in the earth.

In practice I prefer to provide two pairs of claws for each bar 5, as shown in Fig. 2, and to so place them on the bars that one pair of claws will not follow directly in the path of the preceding pair, but will travel in a different set of openings 1$^a$ in the bottom 1 and end 2. Thus the entire bottom of the hopper can be served by the claws and all of the potatoes can be removed. When two pairs of claws are used on each bar, as above stated, two potatoes will be impaled simultaneously and carried over the sprocket 4$^c$. In this case I divide the chute 7 into two branches 7$^a$ and 7$^b$, one discharging at the right and the other at the left of the center line of the machine, so that two rows can be planted simultaneously.

To strip the potatoes from the claws 6, I employ the device illustrated in Fig. 2, in which 8 is a metal frame pivoted at one end to the bar 5 and arranged so that its outer end will normally lie flat upon the face of the bar 5, but can be swung around, so as to pass down the sides of the impaling-prongs in the left side of Fig. 2 and strip the potatoes from them. In order to operate the frames 8 at the proper instant, I provide each frame with a downwardly-projecting trip-lever or wiper 8$^a$.

To operate the wipers, a horizontal bar or rod 9 is provided, being slightly in advance of the plane in which the bars 5 move in the flight 3$^a$ and extending transversely to it. As the bars 5 are carried downward past the rod 9 the projecting wipers 8$^a$ strike the rod 9 and are forced by it to an upright position against the bar, causing the frames 8 to turn about their pivotal points down past the prongs 6, and so to release the potatoes, which drop into the chute.

In practice I prefer to place the driver's seat back of the flight 3ᵃ, so that the driver can at all times watch the operation of the strippers and see that the potatoes are deposited regularly and evenly.

To insure that the potatoes are planted at exact intervals, the lower ends of the chutes can be provided with trap-doors 10, connected by a rocking shaft 11, which is operated by a lever 12, the movement of which opens the doors 10 simultaneously. The lever 12 is provided with an opening 12ᵃ to take a wire or cable 13, carrying buttons or similar projections 13ᵃ. The wire 13 is strung along the field, and by the temporary catching of the buttons 13ᵃ in the openings 12ᵃ the trap-doors 10 are opened to discharge the potatoes.

In carrying out my invention I prefer to drive the conveyer 3 from the main wheels 14 of the machine. The particular mechanism for connecting the shaft 4ᵃ′ to the main shaft 14ᵃ is unimportant, as this may be accomplished in many different ways; but the mechanism which I prefer to employ is shown in Fig. 1, where 15 is a sprocket-wheel fixed to the shaft 14ᵃ. 16 is a driving-chain connecting the sprocket 15 with the sprocket 17, carried by a shaft 17ᵃ. The shaft 17ᵃ also carries a gear 18, and this gear meshes with a second gear 19, mounted on the driving-shaft 4ᵃ′. In the drawings the gears 18 and 19 are represented diagrammatically for the sake of clearness.

I have not illustrated the furrow opening or covering mechanism, as such mechanism is well known, and any suitable form of such device can be employed in connection with my invention.

What I claim as my invention, and desire to secure by Letters Patent, is—

1. A potato-planter comprising in combination a hopper having a slatted bottom and a slatted end; a conveyer mounted to travel outside the hopper in proximity to said bottom and end; impaling-prongs carried by said conveyer and projecting into the hopper through the openings of said bottom and end; and means for operating the conveyer.

2. A potato-planter comprising in combination a hopper having a slatted bottom and a slatted end; a pair of conveyer-chains mounted to travel outside said hopper, in proximity to said bottom and end; traveling bars connecting said chains; prongs mounted on said bars and projecting into said hopper through the openings between the slats of said bottom and end; and means for operating the chains for the purpose set forth.

3. A potato-planter comprising in combination a hopper having a longitudinally-slatted bottom and an inwardly-inclined vertically-slatted end; a pair of conveyer-chains mounted to travel outside said hopper in proximity to said bottom and end; transverse bars carried by said chains; forwardly-projecting prongs mounted on said bars and projecting into the hopper through the openings between the slats of said bottom and end; stripping-frames pivotally mounted on said bars adapted to release the potatoes from the prongs; and means for operating said chains for the purpose set forth.

4. A potato-planter comprising in combination a hopper having a longitudinally-slatted bottom, and a vertically-slatted inwardly-inclined end; a pair of conveyer-chains mounted to travel outside the hopper in proximity to said bottom and end; transverse bars carried by said chains; forwardly-projecting prongs mounted on said bars and projecting through the openings between the slats of said bottom and end into the hopper; stripping-frames pivoted to said bars; a rod to operate said frames; driving-wheels; and driving mechanism connecting said chains with said driving-wheels to actuate said chains.

5. A potato-planter comprising in combination a hopper having a slatted bottom and a slatted end; a pair of conveyer-chains mounted to travel outside said hopper in proximity to said bottom and end; traveling bars connecting said chains; means for actuating said chains; pairs of forwardly-extending prongs mounted on said bars and projecting into the hopper between the slats of said bottom and end; stripping-frames pivotally mounted at one end to said bars, and adapted to pass down the sides of the impaling-prongs to strip the potatoes therefrom; a trip-lever secured to each stripping-frame, and a stationary transverse bar for actuating said trip-lever substantially as described.

6. In combination with a potato-planter of the class described, a pair of conveyer-chains; cross-bars extending transversely from one chain to the other at intervals throughout the length of the chains; a plurality of upwardly-extending prongs secured to each bar, said prongs having forwardly-extending claws, the prongs carried by successive bars traveling in paths offset from each other; a metal frame for each prong, each frame mounted at one end to the cross-bar and having its outer end arranged to pass down the sides of the impaling-prongs, and provided with a downwardly-projecting trip-lever; and a stationary bar for operating said trip-levers; all arranged for the purposes set forth.

In testimony whereof I affix my signature in presence of two witnesses.

JOHN Q. ADAMS.

Witnesses:
I. GOULD,
JAMES C. HANSON.